Reissued Apr. 13, 1943

Re. 22,299

UNITED STATES PATENT OFFICE 22,299

LUBRICATING COMPOSITION

Clarence E. Earle, Washington, D. C.

No Drawing. Original No. 2,274,673, dated March 3, 1942, Serial No. 328,095, April 5, 1940. Application for reissue November 14, 1942, Serial No. 465,642

20 Claims. (Cl. 252—42)

(Granted under the act of March 3, 1883, as amended April 30, 1928; 370 O. G. 757)

This invention relates to lubricants and process of preparing them and refers more particularly to stable grease compositions comprising an oil, a lithium soap and, if desired, stabilizing chemical compounds such as the polymerized esters of the acrylic series.

My invention provides an improved lubricating compound that is chemically and physically stable when subjected to either heat or pressure or both simultaneously.

Heretofore, lubricating greases have been manufactured and produced by compounding mineral oil and metallic salts such as sodium stearate, potassium stearate, or the oleates or other higher fatty acid salts of these two metals or alkaline earth salts of these acids such as those of calcium, barium, strontium, etc. It is significant to point out here that neither the literature nor the books on the art mention the use of lithium salts of the higher carboxylic fatty acids, such as stearates, oleates, palmitates, etc., for producing greases.

I have found that the use of lithium soap or salts of soap forming higher fatty acids in the production of lubricating greases gives the greases entirely different properties from those obtained by the use of the other alkali metal salts. The greases produced by my method are water resistant, whereas the other alkali salts do not give such a property. My lithium soap greases withstand temperature greatly in excess of those containing other alkali metal salts. The properties of these improved lubricating greases are not only widely different from the other alkali metal soap types but also they are much more stable to temperature and pressure, both chemically and physically.

By lithium soap, is meant a true soap or salt of a higher carboxylic fatty acid formed by the replacement of the hydrogen atom of the carboxyl group or groups of the fatty acid or acids and not a compound formed by the addition of some substituent to a carbon atom of the alkyl group of the carboxylic fatty acid.

I have found that the addition of polymerized esters of the acrylic series materially improves the thixotropic properties of my lubricating compounds. Also I have found that the polymers of vinyl esters with long chains enhance the thixotropic properties of these improved lubricating compounds. Polymerized vinyl esters having a hydrocarbon radical containing in excess of six carbon atoms are suitable for this purpose.

Various compositions of mineral oil or vegetable oil, lithium soaps and a stabilizing agent such as polymerized esters of the acrylic series can be used in production of a lubricating grease. As an example, a mixture having the following formulation limits may be employed, the percentages depending upon the type of service for which it is intended:

| | Per cent by weight |
|---|---|
| Mineral oil | 90–54 |
| Lithium soap or salt | 10–40 |
| Polymerized esters of methacrylic acid | 0– 6 |

A preferred process of preparing the lubricating grease is as follows, for example: 85 parts of a mineral oil is heated up to 130° C. to 250° C. at which temperature 14 parts of lithium stearate is added and the temperature maintained for twenty to thirty minutes. After the soap becomes thoroughly mixed with the oil, the temperature is allowed to slowly recede. At about 165° C. while the solution is still fluid one part of cetyl methacrylate is added and thoroughly stirred into the solution. The solution is allowed to cool and jell after which it is ready for use.

My invention includes the employment of polymerized esters of acrylic and methacrylic acids.

I have also found that the addition of small amounts of lithium soaps to lubricating oils improves their lubricating properties, thus lowering the power consumption and leakage from bearing interfaces.

The grease made in accordance with my invention is extremely stable both chemically and physically when subjected to either high temperature or extremely low temperature. A grease of suitable composition made in accordance with my invention will have a melting point in excess of 350° F. and still be sufficiently plastic at minus 50° F. to furnish adequate lubrication to aircraft bearings at high altitude.

It will be recognized that commercial stearic acid is not a pure chemical compound but often contains palmitic and oleic acids and other similar acids in addition to its stearic content. This commercial stearic acid is herein included in the term "stearic acid" and the salts thereof are also included in the term "stearates."

The invention herein described and claimed may be used and/or manufactured by or for the Government of the United States of America for governmental purposes without the payment of any royalties thereon or therefor.

I claim:

1. A lubricating composition comprising oleaginous material selected from the group consisting of mineral and vegetable oils and a thickening agent consisting essentially of a lithium soap of a higher fatty acid in quantity sufficient substantially to thicken said oleaginous material.

2. A lubricating composition comprising oleaginous material selected from the group consisting of mineral and vegetable oils and a thickening agent consisting essentially of a lithium soap of a higher carboxylic fatty acid in quantity sufficient substantially to thicken said oleaginous material.

3. A lubricating composition comprising oleaginous material selected from the group consisting of mineral and vegetable oils and lithium stearate in quantity sufficient substantially to thicken said oleaginous material.

4. A lubricating composition comprising oleaginous material selected from the group consisting of mineral and vegetable oils and a thickening agent consisting essentially of a lithium soap of a higher fatty acid in quantity sufficient substantially to thicken said oleaginous material and a polymerized ester of acrylic acid.

5. A lubricating composition comprising oleaginous material selected from the group consisting of mineral and vegetable oils and a thickening agent consisting essentially of a lithium soap of a higher fatty acid in quantity sufficient substantially to thicken said oleaginous material and a polymerized ester of methacrylic acid.

6. A lubricating composition comprising oleaginous material selected from the group consisting of mineral and vegetable oils and a thickening agent consisting essentially of a lithium soap of a higher fatty acid in quantity sufficient substantially to thicken said oleaginous material and a polymerized vinyl ester having a hydrocarbon radical containing in excess of six carbon atoms.

7. A lubricating composition comprising oleaginous material selected from the group consisting of mineral and vegetable oils and lithium stearate in quantity sufficient substantially to thicken said oleaginous material and a polymerized ester of acrylic acid.

8. A lubricating composition comprising oleaginous material selected from the group consisting of mineral and vegetable oils and lithium stearate in quantity sufficient substantially to thicken said oleaginous material and a polymerized ester of methacrylic acid.

9. A lubricating composition comprising oleaginous material selected from the group consisting of mineral and vegetable oils and lithium stearate in quantity sufficient substantially to thicken said oleaginous material and a polymerized vinyl ester having a hydrocarbon radical containing in excess of six carbon atoms.

10. A lubricating composition comprising mineral oil and a thickening agent consisting essentially of a lithium soap of a higher fatty acid in quantity sufficient substantially to thicken said mineral oil.

11. A lubricating composition comprising mineral oil and a thickening agent consisting essentially of a lithium soap of a higher carboxylic fatty acid in quantity sufficient substantially to thicken said mineral oil.

12. A lubricating composition comprising mineral oil and lithium stearate in quantity sufficient substantially to thicken said mineral oil.

13. A lubricating composition comprising mineral oil and a thickening agent consisting essentially of a lithium soap of a higher fatty acid in quantity sufficient substantially to thicken said mineral oil and a polymerized ester of acrylic acid.

14. A lubricating composition comprising mineral oil and a thickening agent consisting essentially of a lithium soap of a higher fatty acid in quantity sufficient substantially to thicken said mineral oil and a polymerized ester of methacrylic acid.

15. A lubricating composition comprising mineral oil and a thickening agent consisting essentially of a lithium soap of a higher fatty acid in quantity sufficient substantially to thicken said mineral oil and a polymerized vinyl ester having a hydrocarbon radical containing in excess of six carbon atoms.

16. A lubricating composition comprising mineral oil and lithium stearate in quantity sufficient substantially to thicken said mineral oil and a polymerized ester of acrylic acid.

17. A lubricating composition comprising mineral oil and lithium stearate in quantity sufficient substantially to thicken said mineral oil and a polymerized ester of methacrylic acid.

18. A lubricating composition comprising mineral oil and lithium stearate in quantity sufficient substantially to thicken said mineral oil and a polymerized vinyl ester having a hydrocarbon radical containing in excess of six carbon atoms.

19. A lubricating composition comprising vegetable oil and a thickening agent consisting essentially of a lithium soap of a higher carboxylic fatty acid in quantity sufficient substantially to thicken said vegetable oil.

20. A lubricating composition comprising vegetable oil and lithium stearate in quantity sufficient substantially to thicken said vegetable oil.

CLARENCE E. EARLE